Patented Sept. 22, 1931

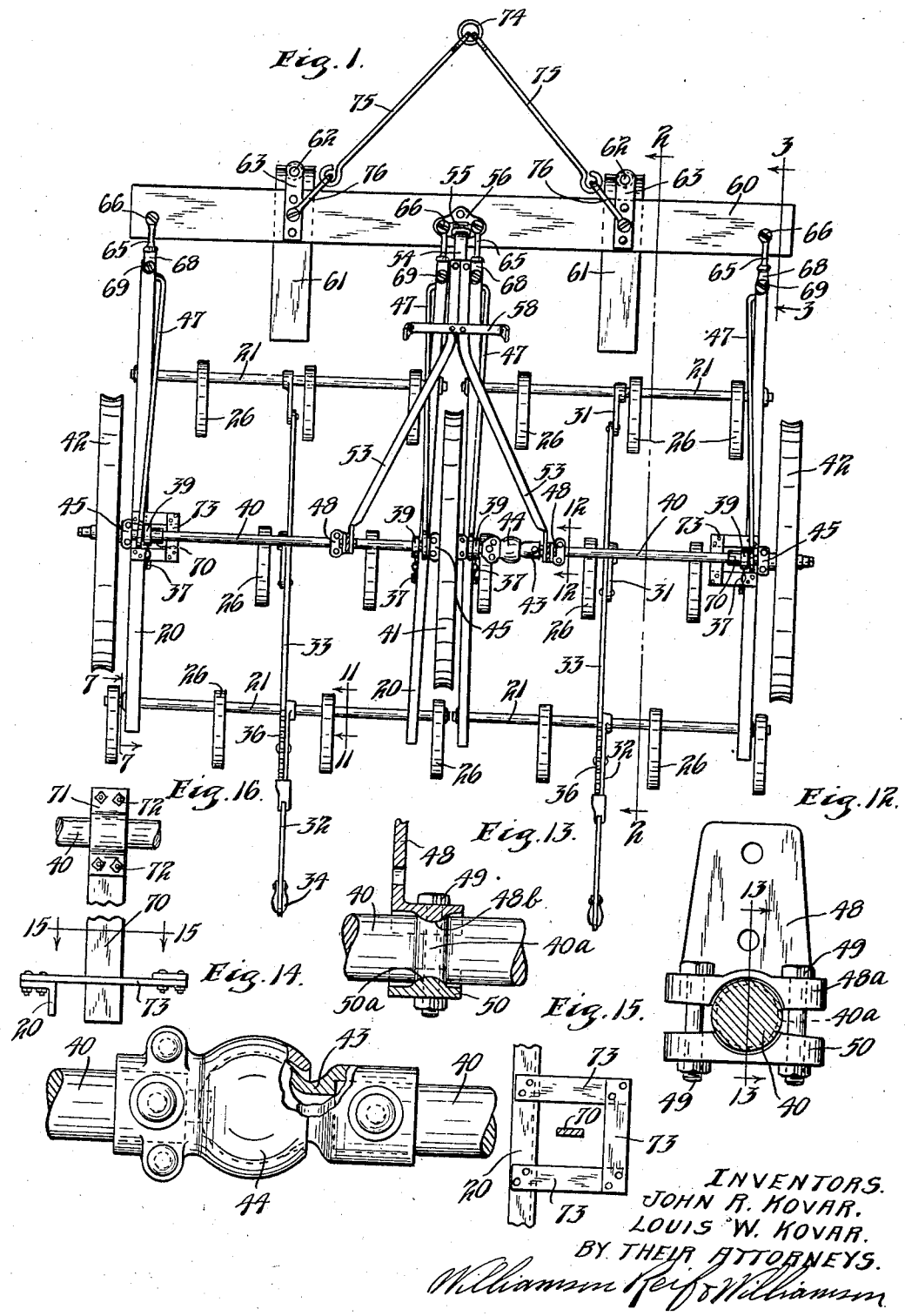

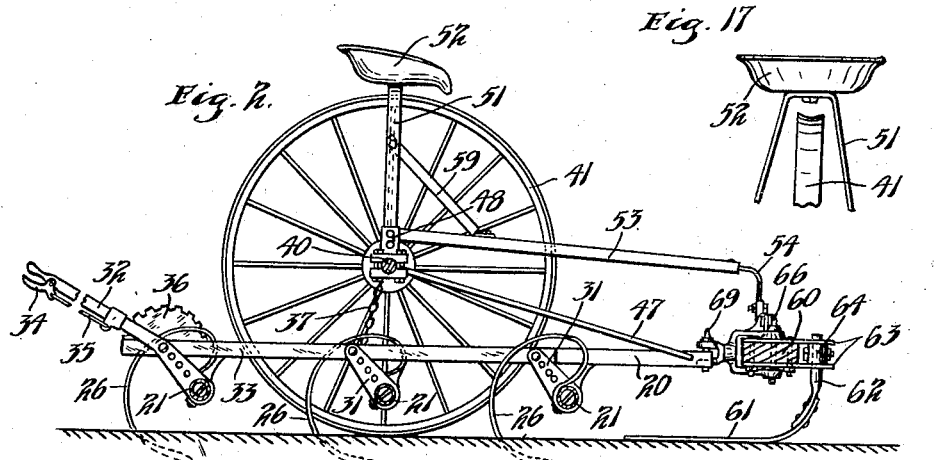

1,824,603

UNITED STATES PATENT OFFICE

JOHN R. KOVAR AND LOUIS W. KOVAR, OF OWATONNA, MINNESOTA

CULTIVATOR STRUCTURE

Application filed November 1, 1928. Serial No. 316,390.

This invention relates to an agricultural implement, such as a harrow or cultivator, and while the various features of the invention could be used on various types of harrows or similar implements, in the embodiment of the invention illustrated, the same is shown applied to a spring tooth harrow.

It is desirable in such an implement or harrow to have sections which are flexibly constructed and which are flexibly connected to the draft means and it is desirable to support the various sections at the desired distance from the ground over which they are travelling.

It is an object of this invention to provide a harrow comprising a section having spaced side bars flexibly carried by tooth-carrying members, said section being adapted to be drawn by a tie bar supported on runners, the drag bars being flexibly connected to said tie bar and supported thereby independently of said runners.

It is another object of this invention to provide a harrow or cultivator having a plurality of tooth-carrying sections each of which has spaced drag bars, a tie bar at the front of said sections, pivotally mounted runners supporting said tie bar and flexible means directly connecting the drag bars of each section to said tie bar and supporting the same from said tie bar independently of said runners.

It is also an object of this invention to provide a harrow having supporting wheels, one or more tooth-carrying sections, each comprising spaced drag bars flexibly connected by a plurality of tooth-carrying members, means supporting said sections from the wheels, a tie bar having supporting means, and means flexibly connecting the ends of the drag bars to said tie bar, said drag bars being connected by said tooth-carrying members and said tie bar.

It is still another object of the invention to provide a harrow or similar implement comprising, a plurality of tooth-carrying sections, a wheel between adjacent sections and a wheel at the outer sides of the outer sections, an axle connecting said wheels and comprising flexibly connected sections together with a seat carrying frame having a side portion disposed at either side of said first mentioned wheel and one of which is rockably connected to the section of the axle at one side of said wheel.

It is still another object of the invention to provide a harrow comprising, supporting wheels and tooth-carrying sections, means flexibly supporting said sections from said wheels and guard means preventing said sections from engaging said wheels.

These and other objects and advantages of the invention will be fully set forth in the following description made in connection with the accompanying drawings, in which like reference characters refer to similar parts throughout the several views, and in which:—

Fig. 1 is a plan view of the device;
Fig. 2 is a vertical section taken on line 2—2 of Fig. 1;
Fig. 3 is a vertical section taken on line 3—3 of Fig. 1;
Fig. 4 is a partial plan view;
Fig. 5 is a view as seen from the right of Fig. 4;
Fig. 6 is a partial plan view, parts thereof being broken away and other parts shown in horizontal section;
Fig. 7 is a vertical section taken substantially on line 7—7 of Fig. 1;
Fig. 8 is a view in elevation as seen from the left of Fig. 7;
Fig. 9 is a vertical section taken on line 9—9 of Fig. 6;
Fig. 10 is a partial view in front elevation showing the connection of the frame and tie bar;
Fig. 11 is a partial view taken on line 11—11 of Fig. 1;
Fig. 12 is a vertical section taken on line 12—12 of Fig. 1;
Fig. 13 is a vertical section taken on line 13—13 of Fig. 12;
Fig. 14 is a partial plan view showing the connection of the axle sections, portions being broken away and other portions shown in horizontal section;

Fig. 15 is a horizontal section taken substantially on line 15—15 of Fig. 16, and Fig. 16 is a partial view in side elevation showing guard means for the sections of the harrow.

The figures above set forth are taken as indicated by the arrows, and

Fig. 17 is a partial view in front elevation of the seat and support.

Referring to the drawings, a harrow or cultivator is shown comprising a plurality of tooth-carrying sections, and while the number of sections may be varied, in the embodiment of the invention as illustrated, said harrow is shown as comprising two sections. Each section includes spaced drag bars 20 which are flexibly connected by a plurality of transversely extending tooth-carrying members 21, shown in the form of tubes or hollow shafts. Drag bars 20 are in the form of angle bars and have bearing brackets 22 secured thereto by the headed and nutted bolts 23 which bearing brackets have apertures through which the ends of shafts 21 extend. The shafts 21 have secured thereto by the headed and nutted bolts 24 saddle plates 25, each having spaced flanges 25a having adjacent sides curving away from each other and embracing the brackets 22, which permit movement of shaft 21 in various directions relative to the brackets 22 and drag bars 20. The shafts 21 have secured thereto at spaced intervals the spring teeth 26, one end of each of said teeth extending partially around shaft 21 and being connected thereto by a headed and nutted bolt 27 which also passes through a shoe 28 engaging the outer side of the tooth 26. The teeth 26 are of the shape shown in Figs. 1 and 2, the same having pointed ends, and said teeth are shown as of extra thickness between the sides of said pointed or tapered front end portion. The forward shafts 21 have connected thereto the arms 31 while the rear shaft 21 has connected thereto the arm 32. The arms 31 and 32 are pivotally connected to a link bar 33. Arm 32 constitutes a lever having an upwardly extending handle portion to which is connected the pawl grip 34 connected by the usual pawl rod 35, with the pawl adapted to fit in any one of the notches of a segment 36 secured to the rear of link bar 33. The lever arm 32 can therefore be swung to simultaneously oscillate the shafts 21. The members 21 constitute the only connection between drag bars 20. The drag bars 20 have secured to their inner sides the lower ends of chains 37, the upper links of which are connected to a headed and nutted bolt 38 extending through the spaced ends of a clip 39 secured to an axle section 40. The clip 39 has a laterally extending portion with a projecting lip 39a extending toward axle section 40. A wheel 41 is provided disposed between the adjacent sections of the harrow and wheels 42 are provided disposed at the outer sides of the outer sections of the harrow. These wheels are journaled on axle sections 40, which axle sections are flexibly connected as shown in Fig. 14. One section 40 has bolted thereto a ball member 43 which is received in another ball member 44, in turn bolted to the other axle section 40. The wheels 42 also have hub members 42a provided with outer cylindrical flanges 42b. These flanges are embraced by the semi-annular members 45 disposed at opposite sides of the axle 40 and clamped thereto by the headed and nutted bolts 46 as shown in Figs. 1, 6 and 9. Bracing rods 47 embrace the axle sections 40, the same being closely adjacent clips 39 and held from lateral movement by the lips 39a. These rods extend forwardly and are bent substantially at right angles at their forward ends and secured in the vertical flanges of angle bars 20 by the cotterpins 47a.

Plates 48 are disposed at each side of the wheel 41 having flanges 48a partially embracing axle 40 and extend at either side thereof, said flanges being connected by the headed and nutted bolts 49 to flanges 50, axle 40 being clamped between said flanges. The flanges 48a and 50 have at their central portions which engage the axle 40 inwardly extending circumferential ribs 48b and 50a which are substantially semi-circular in radial cross section. These ribs extend into a substantially semi-circular groove 40a formed in the axle. With this construction it is seen that a lateral rocking movement can occur between the plate 48 and the axle 40. Plates 48 extend vertically and have bolted thereto the lower ends of said frame portions 51, which extend upwardly and have secured thereto at their top portions the seat 52. The frame members 53 are also bolted at their rear ends to plates 48 and extend forwardly in converging relation, the same having forward portions extending in parallel and contacting relation having bolted thereto a bar 54, which is bent substantially at a right angle to extend downward and is bolted to a member 55 having a flange receiving the attaching bolts and having a bolt 55a at its other end which bolt is received in a bracket 56 having an auxiliary bracket 57 bolted thereto, said brackets 56 and 57 having a spherical recess therebetween in which bolt 55a is held. The frame members 53 have a transverse bar 58 secured thereto intermediate their ends which bar has its end up-turned and forms a foot rest. Brace bars 59 also extend from the side portions 51 downwardly to the bars 53, the same being bolted respectively to said bolts and bars.

A tie bar 60 extends across the front of the sections, the same being supported upon runners 61 which have secured thereto upstanding pins 62 extending through and journaled in spaced plates 63 bolted to the top and bottom of tie bar 60 and projecting forwardly therefrom. A collar 64 is bolted to pin 62 and disposed between the plates 63, thus preventing removal of pin 62. The drag bars 20 are each connected to the tie bar 60 and supported therefrom independently of the runners 61 by a clevis or yoke 65, said member embracing tie bar 60 and having a flat headed bolt 66 constituting a vertical pivot extending through the holes thereof and tie bar 60. Member 65 is swivelly connected by the rivet 67 to a rearwardly extending fork member 68 which loosely embraces the horizontal flange of the angle bar 20 through which and the arms of the member 68 extends a flat headed bolt 69 constituting a vertical pivot. The clevis or yoke 65, vertical pivot 66, swivelling rivet 67, fork 68, and bolt or vertical pivot 69, in cooperation, constitute efficient means for flexibly connecting the forward ends of the drag bars with the tie bar and it will be noted that the said drag bars are supported independently of the runners. The hole through said horizontal flange is somewhat larger in diameter than the diameter of bolt 69.

A bar 70 extends downward from the outer end of each axle section 40, said bar extending around one side of said axle and being clamped thereto by a plate 71 also extending about the other side of said axle and being connected to bar 70 by the headed and nutted bolts 72. Bar 70 at its lower end extends into the rectangular open frame formed by three short bars 73 riveted together and to the horizontal flange of angle or drag bar 20. Bar 70 and bars 73 form a guard preventing the sections from swinging into the wheels 41 and 42.

The cultivator is drawn forwardly by traction means connected to a link 74 in which are received the eyeleted ends of links 75 having eyelets at their rear ends passing through the clevises 76 which embrace tie bar 60 and are secured thereto by one of the bolts securing the plates 63.

In operation the harrow will be drawn forwardly over the ground and the levers 32 will be adjusted to swing the rock shafts 21 so that the points of the teeth 26 will enter the ground to the desired depth. The tie bar 60 is supported on the runners 61, which runners can swing about vertical axes and the drag bars 20 are connected to and supported from the tie bar 60 independently of the runners 61. The connection of the drag bars to the tie bar is a flexible one and there is considerable flexibility in the harrow sections themselves on account of the range of movement between the rock shafts 21 and drag bars 20. The intermediate wheel or wheels 41 will insure that the sections will move substantially parallel with the ground no matter what the contour thereof. It will be seen that the teeth 26 are staggered on the rock shafts 21 so that the paths made by all of the teeth are in substantially equally spaced relation. With the flexibly connected axle sections, if the portions of said frame 51 were connected rigidly to the wheels, there would be a racking movement given to the frame when the axle sections moved relatively to each other. For this reason one or both of the side portions of frame 51 are rockably connected by members 48 and 50 as described. This relieves the racking movement and strain on the said frame. The bars 70 can move laterally in the opening between bars 73 and the drag bar 20 for a considerable distance, but will strike the sides of the opening before the sections swing into the wheels. The engagement of the sections and wheels is thus prevented while at the same time the harrow sections can move a considerable distance laterally. It will be noted that the drag bars 20 are spaced and positioned only by the rock shafts 21 and the tie bar 60.

From the above description it is seen that applicant has provided a simple and efficient structure of harrow or cultivator and one in which the number of parts is quite small. The structure is very simple but at the same time the implement is very ruggedly and durably made. The device has been amply demonstrated in actual practice and found to be very successful and efficient.

The invention disclosed in the present application may be considered as an improvement upon that disclosed in the applicant's co-pending applications S. N. 219,424, filed September 14th, 1927 and S. N. 283,542, filed June 7th, 1928.

It will, of course, be understood that various changes may be made in the form, details, proportions and arrangement of the parts, without departing from the scope of applicant's invention, which generally stated, consists in a device capable of carrying out the objects above set forth, in the novel parts and combinations of parts disclosed and defined in the appended claims.

What is claimed is:—

1. A harrow having in combination, a plurality of tooth-carrying sections each comprising spaced drag bars flexibly connected solely by a plurality of tooth-carrying members, a tie bar at the front of said sections, a plurality of runners pivotally connected to said tie bar about vertical axes and disposed within the outer drag bars and flexible means directly connecting said drag bars to said tie bar and supporting said drag bars independently of said runners.

2. A harrow having in combination, a plurality of tooth-carrying sections, each comprising a pair of spaced drag bars, tooth-carrying means flexibly connecting said drag bars, a wheel disposed between adjacent sections, a wheel at the outer side of each end section, an axle for said wheels comprising flexibly connected sections, means for supporting said harrow sections from said axle, a tie bar at the front of said sections, runners pivotally connected to said tie bar for supporting the same and means flexibly connecting said drag bars to said tie bar and supporting said drag bars independently of said runners.

3. A harrow having in combination, a plurality of tooth-carrying sections, a wheel disposed between adjacent sections, a wheel at the outer side of each of the outer sections, an axle for said wheels comprising flexibly connected sections and a seat frame having side portions disposed at either side of said first mentioned wheel and connected respectively to the sections of said axle at either side of said wheel, one of said portions being connected to its respective axle section for lateral rocking movement on said axle.

4. A harrow having in combination, a plurality of tooth-carrying sections, a wheel disposed between adjacent sections, a wheel at the outer side of each of the outer sections, an axle for said wheel, means for flexibly supporting said harrow sections from said axle and guard means preventing said sections from engaging said wheels comprising a member depending from said axle and means carried by the adjacent section having an opening into which said last mentioned member extends, said member being adapted to engage the sides of said opening to limit the movement of said section.

5. A harrow having in combination, a tooth-carrying section comprising spaced drag bars flexibly connected by a plurality of transverse tooth-carrying members, a tie bar spaced from and disposed forwardly of the forward ends of said drag bars, means connecting each of said drag bars to said tie bar, said means comprising a member having a yoke embracing said tie bar and connected thereto by a vertical pivot, and a member swivelly connected to said first mentioned member for pivotal movement on a horizontal axis, said latter member being connected to the forward end of a drag bar by a vertical pivot and wheels at the outer sides of said tooth-carrying section.

6. A harrow having in combination, a plurality of tooth-carrying sections, each comprising a pair of spaced drag bars flexibly connected by a plurality of tooth-carrying members, a tie bar disposed forwardly of said sections, a wheel at the outer side of each end section, an axle for said wheels comprising flexibly connected sections, means for suspending said tooth-carrying sections from said axle, means for supporting said tie bar from the ground and means connecting each of said drag bars to said tie bar, said means including an element connected to said tie bar by a vertical pivot and a second element swivelly connected to said first mentioned element for pivotal movement on a horizontal axis, said second element having a pivotal connection with the forward end of the drag bar on a vertical axis.

7. A harrow having in combination, a plurality of tooth-carrying sections each comprising spaced drag bars flexibly connected by a plurality of tooth-carrying members, a wheel at the outer side of each end section, an axle for said wheels comprising flexibly connected sections, means including connections between said axle and the forward ends of said drag bars for supporting said tooth-carrying sections from said axle, a tie bar disposed forwardly of said tooth-carrying sections, runners pivotally connected to said tie bar for supporting the same and means flexibly connecting the forward end of said drag bars with said tie bar, the forward ends of said drag bars being supported independently of said runners.

In testimony whereof we affix our signatures.

JOHN R. KOVAR.
LOUIS W. KOVAR.